(12) United States Patent
Nola et al.

(10) Patent No.: US 9,374,536 B1
(45) Date of Patent: Jun. 21, 2016

(54) VIDEO CAPTIONING COMMUNICATION SYSTEM, DEVICES AND RELATED METHODS FOR CAPTIONING DURING A REAL-TIME VIDEO COMMUNICATION SESSION

(71) Applicant: CaptionCall, LLC, Salt Lake City, UT (US)

(72) Inventors: Pat Nola, Salt Lake City, UT (US); Shane A. Roylance, Farmington, UT (US); Merle L. Walker, III, Sandy, UT (US)

(73) Assignee: CaptionCall, LLC, Salt Lake City, UT (US)

( * ) Notice: Subject to any disclaimer, the term of this patent is extended or adjusted under 35 U.S.C. 154(b) by 0 days.

(21) Appl. No.: 14/939,831

(22) Filed: Nov. 12, 2015

(51) Int. Cl.
*H04N 7/14* (2006.01)
*H04N 5/278* (2006.01)

(52) U.S. Cl.
CPC ............... *H04N 5/278* (2013.01); *H04N 7/141* (2013.01)

(58) Field of Classification Search
USPC .......................................................... 379/52
See application file for complete search history.

(56) References Cited

U.S. PATENT DOCUMENTS

| | | | |
|---|---|---|---|
| 5,815,196 A | 9/1998 | Alshawi | |
| 5,909,482 A | 6/1999 | Engelke | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,188,429 B1 | 2/2001 | Martin et al. | |
| 6,233,314 B1 | 5/2001 | Engelke | |
| 6,307,921 B1 | 10/2001 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,549,611 B2 | 4/2003 | Engelke et al. | |
| 6,567,503 B2 | 5/2003 | Engelke et al. | |
| 6,594,346 B2 | 7/2003 | Engelke | |

(Continued)

FOREIGN PATENT DOCUMENTS

| | | |
|---|---|---|
| CN | 101500127 A | 8/2009 |
| CN | 104780335 A | 7/2015 |

(Continued)

OTHER PUBLICATIONS

Ntouch https://web.archive.org/web/20121213084935/http://www.sorensonvrs.com/ntouch/ntouchvp_how_to?video=12038-NVP-VC-SM-Change_e_944x528, as early as Dec. 2012.

(Continued)

*Primary Examiner* — Maria El-Zoobi
(74) *Attorney, Agent, or Firm* — TraskBritt

(57) ABSTRACT

Apparatuses and methods are disclosed for providing captioning of a video communication session for a conversation between at least two users in which media data is communicated between at least two communication devices during a video communication session involving a video captioning service. The video captioning service provides text captions for the far-end audio of the video communication session, in which the user of the second communication device is associated with a hearing-capable user that is not authorized to receive text captions from the video communication service during the video communication session.

22 Claims, 13 Drawing Sheets

(56) References Cited

U.S. PATENT DOCUMENTS

| | | | |
|---|---|---|---|
| 6,603,835 B2 | 8/2003 | Engelke et al. | |
| 6,748,053 B2 | 6/2004 | Engelke et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |
| 7,003,082 B2 | 2/2006 | Engelke et al. | |
| 7,006,604 B2 | 2/2006 | Engelke | |
| 7,164,753 B2 | 1/2007 | Engelke et al. | |
| 7,319,740 B2 | 1/2008 | Engelke et al. | |
| 7,502,386 B2 | 3/2009 | Goto | |
| 7,526,306 B2 | 4/2009 | Brems et al. | |
| 7,555,104 B2 | 6/2009 | Engelke | |
| 7,660,398 B2 | 2/2010 | Engelke et al. | |
| 7,792,676 B2 * | 9/2010 | Klinefelter | G06Q 10/10 704/271 |
| 7,881,441 B2 | 2/2011 | Engelke et al. | |
| 8,213,578 B2 | 7/2012 | Engelke et al. | |
| 8,289,900 B2 | 10/2012 | DuMas et al. | |
| 8,379,801 B2 | 2/2013 | Romriell et al. | |
| 8,416,925 B2 | 4/2013 | Engelke et al. | |
| 8,447,362 B2 | 5/2013 | Takeoka et al. | |
| 8,577,895 B2 | 11/2013 | Gupta et al. | |
| 8,634,861 B2 | 1/2014 | Repka | |
| 8,832,190 B1 | 9/2014 | Leske et al. | |
| 8,908,838 B2 | 12/2014 | Engelke et al. | |
| 8,913,099 B2 | 12/2014 | Tsang et al. | |
| 8,917,821 B2 | 12/2014 | Engelke et al. | |
| 8,917,822 B2 | 12/2014 | Engelke et al. | |
| 9,219,822 B2 | 12/2015 | Baccay et al. | |
| 9,247,052 B1 | 1/2016 | Walton | |
| 2005/0086699 A1 | 4/2005 | Hahn et al. | |
| 2007/0064743 A1 | 3/2007 | Bettis et al. | |
| 2007/0207782 A1 | 9/2007 | Tran | |
| 2008/0094467 A1 | 4/2008 | An et al. | |
| 2008/0187108 A1 * | 8/2008 | Engelke | G10L 15/265 379/52 |
| 2010/0031180 A1 | 2/2010 | Shin et al. | |
| 2011/0123003 A1 * | 5/2011 | Romriell | G06F 17/273 379/52 |
| 2011/0170672 A1 | 7/2011 | Engelke et al. | |
| 2011/0246172 A1 | 10/2011 | Liberman et al. | |
| 2012/0250837 A1 | 10/2012 | Englekle et al. | |
| 2013/0005309 A1 | 1/2013 | Clark | |
| 2013/0033560 A1 * | 2/2013 | Rasalkar | H04M 3/5315 348/14.01 |
| 2013/0308763 A1 | 11/2013 | Engelke et al. | |
| 2014/0006343 A1 | 1/2014 | Allison | |
| 2014/0282095 A1 | 9/2014 | Walters et al. | |
| 2015/0011251 A1 | 1/2015 | Parker | |
| 2015/0046553 A1 | 2/2015 | DeBenedictis et al. | |
| 2015/0094105 A1 | 4/2015 | Pan | |
| 2015/0100981 A1 | 4/2015 | Gao et al. | |
| 2015/0288927 A1 | 10/2015 | Haginas et al. | |
| 2015/0373173 A1 | 12/2015 | Taher | |
| 2016/0014164 A1 | 1/2016 | Kashimba et al. | |
| 2016/0037126 A1 | 2/2016 | Polyakov et al. | |

FOREIGN PATENT DOCUMENTS

| | | |
|---|---|---|
| KR | 20080003494 A | 1/2008 |
| KR | 20120073795 A | 7/2012 |
| WO | 2010148890 | 12/2010 |
| WO | 2015131028 A1 | 9/2015 |

OTHER PUBLICATIONS

Rupert, Dave, Caption Everything; Usign HTML5 to create a real-tiime closed captioning system; website article, http://daverupert.com/2013/11/caption-everything/, Nov. 13, 2013, 6 pages.

CaptionCall, LLC, Stay Connected With CaptionCall!, website: http://captioncallphone.com/?source={source}&medium={medium}&term={term}&gclid=CPHhjsPK68oCFQl8vQodSHkEgw; 2015, 3 pages.

FCC; Internet Protocol (ip) Captioned Telephone Service, website: https://www.fcc.gov/consumers/guides/internet-protocol-ip-captioned-telephone-service, Dec. 10, 2015, 3 pages.

3 Play Media; Video Captioning & Transcription Services, website: http://www.3playmedia.com/services-features/services/captioning-transcription/, 2016, 6 pages.

* cited by examiner

VIDEO CAPTIONING COMMUNICATION SYSTEM, DEVICES AND RELATED METHODS FOR CAPTIONING DURING A REAL-TIME VIDEO COMMUNICATION SESSION

FIELD

The application relates generally to telecommunications and more particularly to communicating with a video captioning service for assisting hearing-impaired users in communicating with others during a real-time video communication session.

BACKGROUND

Hearing-impaired individuals may benefit from communication systems and devices configured to provide assistance in order to communicate with other individuals over a communication network. For example, captioning services have been established to provide assistive services (e.g., text captions) to the hearing-impaired user communicating with a communication device (e.g., caption phone, caption enabled device, etc.) that is specifically configured to communicate with the captioning service.

For example, FIG. 1 illustrates a conventional communication system 100 configured to facilitate an assisted call between a hearing-impaired user 102 and a far-end user 104. The communication system 100 may include a first communication device 110, a second communication device 120, and a captioning service 130. The first communication device 110 and the second communication device 120 may be coupled together to facilitate communication therebetween via a first network 140. The first communication device 110 and the captioning service 130 may be coupled together to facilitate communication therebetween via a second network 150. For example, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.).

The captioning service 130 may be a telecommunication assistive service, which is intended to permit a hearing-impaired person to utilize a communication network and assist their understanding of a conversation by providing text captions to supplement the voice conversation. The captioning service 130 may include an operator, referred to as a "call assistant," who serves as a human intermediary between the hearing-impaired user 102 and the far-end user 104. During a captioning communication session, the call assistant may listen to the audio signal of the far-end user 104 and "revoice" the words of the far-end user 104 to a speech recognition computer program tuned to the voice of the call assistant. Text captions (also referred to as "captions") may be generated by the speech recognition computer as a transcription of the audio signal of the far-end user 104, and then transmitted to the first communication device 110 being used by the hearing-impaired user 102. The first communication device 102 may then display the text captions while the hearing-impaired user 102 carries on a normal conversation with the far-end user 104. The text captions may allow the hearing-impaired user 102 to supplement the voice received from the far-end and confirm his or her understanding of the words spoken by the far-end user 104.

In a typical call, the first communication device 110 may include a device that is configured to assist the hearing-impaired user 102 in communicating with another individual (e.g., far-end user 104), while the second communication device 120 may comprise a conventional voice telephone (e.g., landline phone, cellular phone, smart phone, VoIP phone, etc.) without such abilities and without the capability to communicate with the captioning service 130. As a result, certain limitations have been appreciated by the inventors in the functionality of conventional captioning systems as will be discussed herein below.

BRIEF SUMMARY

Embodiments of the disclosure include a communication device specifically configured for use by a hearing-impaired user. The communication device comprises a microphone configured to generate near-end audio, a camera configured to generate near-end video; communication elements configured to communicate media data with a second communication device and receive text data from a video captioning service during a video communication session, an electronic display, and a processor. The communication elements are configured to transmit the near-end audio and the near-end video to the second communication device, receive far-end audio and far-end video from the second communication device, and receive the text data from the video captioning service, the text data including a text transcription of the far-end audio. The electronic display is configured to display the text data as text captions along with the far-end video during the video communication session. The processor is operably coupled with the microphone, the camera, the communication elements, and the electronic display, and configured to control the operation thereof in communicating with the second communication device and the video captioning service during the video communication session, wherein the second communication device is associated with a hearing-capable user that is not authorized to receive text captions from the video communication service during the video communication session.

In some embodiments, a video captioning communication system comprises a far-end communication device configured to generate audio data and video data transmitted to a near-end communication device during a real-time video communication session with the near-end communication device; and a video captioning service configured to receive the far-end audio and generate text data with a text transcription of the far-end audio, and transmit the text data to the near-end communication device during the video communication session. The far-end communication device is associated with a hearing-capable user that is not authorized to receive text captions during the video communication session.

In some embodiments, a method is disclosed for captioning a video communication session for a conversation between at least two users. The method comprises setting up a video communication session between a first communication device and a second communication device, communicating media data between the first communication device and the second communication device during the video communication session, the media data including near-end audio and near-end video from the first communication device and far-end audio and far-end video from the second communication device, communicating the far-end audio to a video captioning service during the video communication session through a video call application stored on the second communication device that is not authorized to receive text captions from the video captioning service, communicating text captions from the captioning communication service to the first communication device corresponding to a text transcription of the far-end audio during the video communication session, and displaying the text captions and the far-end video on an electronic display of the first communication device during the video communication session.

In some embodiments, a method for captioning a communication session for a conversation between at least two users is disclosed. The method comprises setting up a communication session between a first communication device and a second communication device, communicating media data between the first communication device and the second communication device during the video communication session. The media data including near-end audio from the first communication device and far-end audio from the second communication device. The method further includes communicating the far-end audio to a video captioning service during the communication session through at least one of a call application stored on the second communication device that is not authorized to receive text captions from the captioning service or through the first communication device, communicating locally generated text captions to the captioning communication service from at least one of the first communication device or the second communication device, communicating edited text captions from the captioning communication service to the first communication device, and displaying the text captions on an electronic display of the first communication device during the communication session. The text captions correspond to a text transcription of the far-end audio during the communication session.

DETAILED DESCRIPTION

Figure 1:
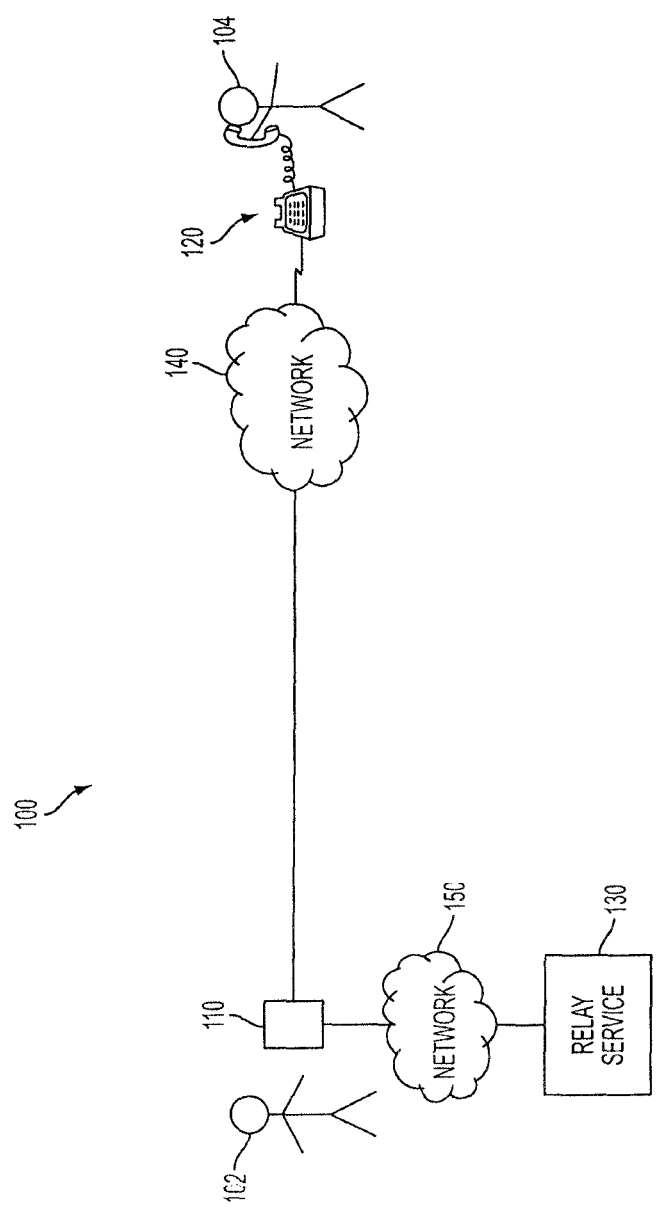
FIG. 1 illustrates a conventional communication system configured to facilitate a call between a hearing-impaired user and a far-end user.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video captioning service for providing text captions to a caption-enabled communication device to assist hearing-impaired users during video communication sessions. Embodiments include features that improve the functionality of the communication device such that new communication device, system, and method for establishing video captioning communication sessions are described. As a result, the interaction of the communication device with the captioning service may be improved with new functionality, particularly in the ability to communicate in a closed system with registered hearing-capable users.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication devices often have some level of hearing ability that has usually diminished over a period of time such that they can communicate by speaking, but that they often struggle in hearing and/or understanding the far-end user.

The term "call" as used herein refers to the communication session between the hearing-impaired user's communication device and the far-end user's communication device. The call may pass audio signals between the two parties. At times, the call may be referred to as incoming or outgoing from the perspective of the hearing-impaired user's communication device. Incoming and outgoing calls may refer to the period of time prior to when the call is "answered" by the other party to begin the communication of the audio signals therebetween. Generally, when discussing calls herein, they are often referred to from the perspective of the communication device associated with the hearing-impaired user. Thus, an "incoming call" may originate from a far-end user to a near-end communication device and an "outgoing call" may originate from a near-end user to a far-end communication device. Of course, it is recognized that "near-end" and "far-end" are relative terms depending on the perspective of the particular user. Thus, the terms "near-end" and "far-end" are used as a convenient way to distinguish between users and devices. The terms "near-end" and "far-end" may also be referred to as "local" and "remote," respectively.

The term "audio" (or voice) refers to the audio signal generated and transmitted by a communication device during a call. Most examples are provided from the perspective of a hearing-impaired user using a captioning communication device, such that the audio signal captured by that device is sometimes referred to as the "near-end audio," and the audio signal received to be reproduced by the speaker is sometimes referred to as the "far-end audio." Similarly, the term "video" refers to the video signal generated and transmitted by the communication device during the call. The video signal captured by the captioning communication device may be referred to as "near-end video," and the video signal received by the captioning communication device may be referred to as the "far-end video."

The use of the terms "network" or "communication network" as used herein contemplates networks that are compatible and configured to provide communications using analog and/or digital standards unless specifically stated otherwise. For example, networks may be implemented according to the standards and bandwidth requirements of a communication network (e.g., Public Switch Telephone Network (PSTN), cellular network, Voice Over Internet Protocol (VOIP) networks, etc.).

Embodiments of the disclosure include a video captioning service that is configured to provide interpretive services (e.g., captioning) to the hearing-impaired user for a video communication session. In some embodiments, a human "call assistant" within the video captioning service may be employed to facilitate an assisted call between a hearing-impaired user and a far-end user by providing text captions of at least a portion of the video conversation. In some embodiments, the call assistant may listen to at least the far-end audio received and assist in the generation of the text captions that are transmitted to the first communication device for display thereon. As a result, the hearing-impaired user may have an improved experience in understanding the conversation. Such an system may be useful for people whose hearing has been damaged or decreased over time (e.g., the elderly), such that they can still speak but have diminished hearing that makes it difficult to communicate. The video captioning services described herein may be an improvement over conventional internet protocol captioned telephone services (IPCTS), captioned telephone service (CTS), or other telecommunications relay services (TRS) that do not provide the ability to provide captions to real-time video communication sessions—particularly for communicating with hearing-capable users who have conventional devices that are not authorized to receive text captions during the video communication session.

Figure 2:
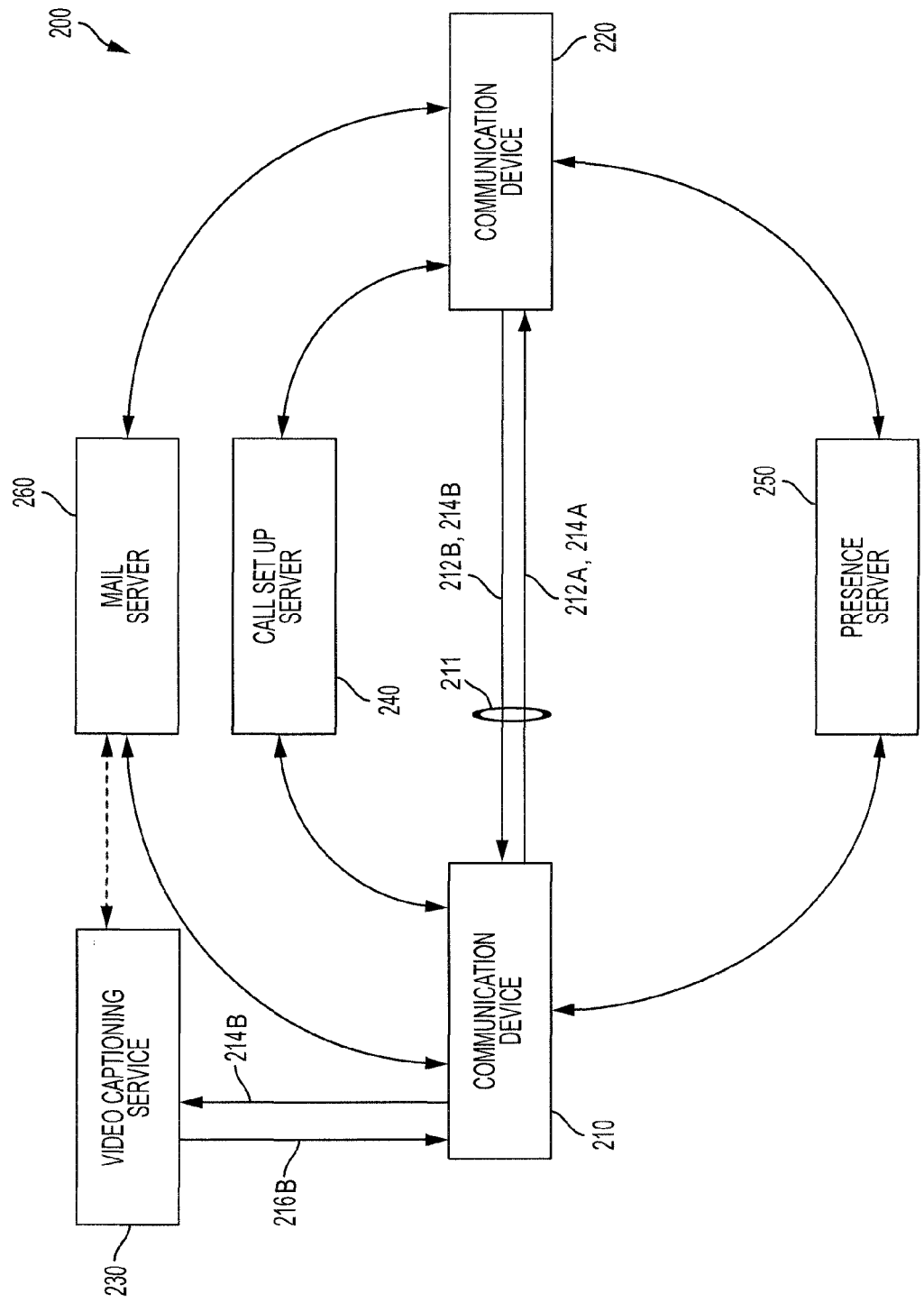
FIGS. 2 through 10 are simplified block diagrams of video captioning communication systems according to various embodiments of the disclosure.

FIG. 2 is a simplified block diagram of a video captioning communication system 200 according to an embodiment of the disclosure. The video captioning communication system 200 may include a first communication device 210, a second communication device 220, and a video captioning service 230. The video captioning communication system 200 may be configured to facilitate an assisted call between a hearing-impaired user (through the first communication device 210) and a far-end user (through the second communication device 220) during a real-time video communication session during which media data 211 is communicated between the communication devices 210, 220.

The first communication device 210 may be a device (i.e., endpoint) that is specifically configured to assist a hearing-impaired user (e.g., hard of hearing) communicating with another individual. In some embodiments, the first communication device 210 may include a caption-enabled communication device configured to receive and display text captions of at least a portion of the conversation. Such a caption-enabled communication device may include a caption telephone, a software endpoint running on a mobile device (e.g., laptop, tablet, smart phone, etc.) or other computing device (e.g., desktop computer), a set top box, or other communication device specifically configured to facilitate captioning during a video communication session. Thus, the hearing-impaired user may be able to read the text captions of the words spoken by the far-end user to supplement the audio signal received by the first communication device 210. The first communication device 210 may also include an electronic display and video encoder/decoder that are configured to receive and display real-time video on the first communication device 210, with the text captions being provided to the hearing-impaired user with the real-time video displayed on the electronic display.

The second communication device 220 may comprise a communication device (e.g., cellular phone, smart phone, VoIP phone, tablet, laptop, etc.) that is configured to capture and provide far-end video 212B and far-end audio 214B from the second communication device 220 to the first communication device 210. Likewise, the second communication device 220 may be configured to receive near-end video 212A and near-end audio 214A from the first communication device 210. In some embodiments in which hearing-impaired users are on both sides of the conversation, the second communication device 220 may be the same type of device as the first communication device 210. In such an embodiment, both the first communication device 210 and the second communication device 220 may be authorized to receive and display text captions from the video captioning service 230. In some embodiments, the second communication device 220 may not be configured for use by a hearing-impaired user authorized to receive text captions. In such an embodiment, the second communication device 220 may be a hearing-capable user device that typically only has voice and video call capabilities without the ability or authorization to receive text captions from the video captioning service 230. The video captioning service 230 may nevertheless support captioning for the first communication device 210 for providing captioning of the far-end audio 214B to the first communication device 210.

In some embodiments, the video captioning communication system 200 may be a closed system in that each communication device participating in a video communication session supported by the video captioning communication system 200 may be required to be registered with the video captioning communication system 200—including those communication devices used by hearing-capable users that are not authorized to receive text captions themselves from the video captioning service 230. Registering with the video captioning communication system 200 may include registering the communication device with a session initiation protocol (SIP) register associated with the video captioning service 230. In order to transform the second communication device 220 associated with a hearing-capable user into a device that is configured to participate in a supported video call with the video captioning service 230, the a video call application provided by the video captioning service 230 may be downloaded and installed on the second communication device 220.

The hearing-impaired user associated with the first communication device 210 may desire to participate in video communication sessions with individuals who do not have a device that is registered with the video captioning service 230 or have the video call application installed thereon. The first communication device 210 may be configured to send invitations to devices requesting their users to register and download the video call application to be a participant in this closed system. The hearing-impaired user may enter specific numbers (e.g., phone numbers, IP addresses, etc.) into the first communication device 210 or select individuals from their current contact list for sending an invitation thereto. The invitation may be sent as a text message, email message, or other message with information regarding the video captioning service 230, who sent the invitation, and instructions (e.g., hyperlink to a store or site) to download the video call application. In some embodiments, the first communication device 210 may be configured to detect whether a phone number is capable of video communication and deny invitations from being sent to devices that are not capable of such communication (e.g., conventional landline phones).

Within the user interface of the first communication device 210, the user may manage the invitations sent to others. The contact list within the user interface may have an icon indicating whether each individual contact is registered with the video captioning service 230. If so, the icon may also indicate whether the contact is currently available for receiving a video call. If not, the icon may indicate that an invitation may be sent or if an invitation has already been sent without an action being taken. Selecting the icon may initiate an action depending on its state. For example, selecting the icon showing that the corresponding individual is registered with the service and available for a video call may initiate a video call the second communication device 220 associated with that user. Selecting the icon showing that the corresponding individual is not registered with the service may generate and send an invitation to the second communication device 220 associated with that user.

Responsive to receiving and accepting the invitation, the second communication device 220 may install the video call application and instruct the hearing-capable user to register with the video captioning service (e.g., by providing user information such as name, email address, phone numbers, etc.). In some embodiments, the registration may occur automatically in that the video captioning service 230 may simply store the associated phone number and other device information that is retrievable without requesting any additional information to be input by the hearing-capable user. Of course, a hearing-capable user may download the video call application and register with the video captioning service 230 on their own initiative without receiving an invitation.

The video captioning service 230 may, therefore, maintain one or more databases with information about the registered users (both hearing-impaired and hearing-capable users) such as profile information, contact information, invitation status information, call information, among other information. The video captioning service 230 may link registered users with the contact lists of the other registered users within the video captioning service 230. As a result, even though the second communication device 220 may have been added as a registered device due to accepting an invitation from a particular user, the video captioning service 230 may query the contact lists for all registered users and link the device to entries within the contact lists of other users. As a result, the corresponding entries in the contact lists shown by other registered users may also update to reflect that the communication device is now registered and capable of participating in video communications sessions in which captions are available to any hearing-impaired users within the video captioning communication system 200.

Through the user interface of the first communication device 210, the hearing-impaired user may manage other functions for the first communication device 210. For example, the first communication device 210 may place outgoing video calls, receive incoming video calls, manage video calls in progress (i.e., established video communication sessions), manage device settings, record a video greeting and/or outgoing message, maintaining lists (e.g., contact list, blocked call list, recent call list), etc. In-call management may include ending a call (i.e., hanging up), turning on/off captions (which may terminate the connection to the video captioning service 230), changing views of different video feeds, changing how and where captions are displayed, adjusting the camera, muting the microphone, turn off video, etc. Device settings may include camera settings (e.g., pan, tilt, zoom), volume settings, turning on/off video call availability, display settings, ring settings, etc.

Through the user interface of the second communication device 220, the user may manage other functions for the second communication device 220. In general, the second communication device 220 may be configured to manage the same functions as the first communication device 210—particularly if the second communication device 220 is a caption enabled device for a hearing-impaired user. For devices that are not associated with a hearing impaired user, the video call application installed on the second communication device 220 may not provide functionality to receive/display text captions from the video captioning service 230 or other captioning related functions. In some embodiments, the hearing-user of the second communication device 220 may be permitted through the user interface to send invitations to others as well (e.g., hearing users or hearing-impaired users) who they think might desire such a service.

In addition to providing text transcriptions of a received audio signal, the video captioning service 230 may be configured to provide additional functions, such as routing video calls, associating video call applications (for hearing-capable users) with contact lists for the caption enabled devices, store recorded video greetings, monitor video call usage, as well as manage invitations and requests. Usage monitoring may include reporting on the number of video calls placed, received, answered, and/or not answered by each device, reporting on the devices using NAT traversal, reporting on the number and/or percentage of contacts that are registered with the video captioning service 230, reporting on the conversion rate of invites vs. video call application installs, among other desired metrics.

In operation, the near-end video 212A and near-end audio 214A may be captured and transmitted from the first communication device 210 to the second communication device 220. Far-end video 212B and far-end audio 214B may be captured and transmitted from the second communication device 220 to the first communication device 210. The video captioning service 230 may be configured to receive the far-end audio 214B and generate a text transcription thereof for transmission of the text data 216B to the first communication device 210 for display thereon during the video communication session.

As shown in FIG. 2, the far-end audio 214B may be provided to the video captioning service 230 by the first communication device 210 in some embodiments. In other words, FIG. 2 shows a configuration where the first communication device 210 acts as a router for the voice signal from the second communication device 120 to the captioning service 130. In such an embodiment, the far-end audio 214B may be transmitted from the second communication device 220 to the first communication device 210. The far-end audio 214B may then be transmitted from the first communication device 210 to the video captioning service 230 for the text captions to be generated in a text captioning embodiment. The text captions may then be transmitted from the video captioning service 230 to the first communication device 210 to be displayed as text captions for the hearing-impaired user to read during the conversation. The call assistant may also monitor the text captions that are generated and transmitted to the first communication device 210 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments, another device may receive the far-end audio 214B from the second communication device 220 and split the far-end audio 214B to route to both the first communication device 210 and the video captioning service 230.

In addition, although FIG. 2 shows only two communication devices 210, 220, the video captioning communication system 200 may include more communication devices. It is contemplated that the video captioning communication system 200 may facilitate communication between any number and combinations of hearing-impaired users and far-end users. For example, in some embodiments two or more communication devices may be connected for facilitating communication between a hearing-impaired user and other hearing-impaired users and/or far-end users. In addition, in some embodiments, the second communication device 220 may be configured similarly as the first communication device (e.g., caption-enabled communication device). As a result, the second communication device 220 may likewise be operated by a hearing-impaired user. Thus, although facilitating communication between the hearing-impaired user and the far-end user is shown in FIG. 2 to imply that the far-end user is a hearing-capable user, such a situation is shown only as an example. Other embodiments include both the first communication device 210 and the second communication device 220 coupled to the video captioning service 230 to facilitate the captioning services for each respective hearing-impaired user. In such a situation, each communication device 210, 220 may have its own connection with the video captioning service 230 in which the text data is received and displayed for the audio signal of the other party.

The first communication device 210, the second communication device 220, and the video captioning service 230 may be coupled together to facilitate communication therebetween via one or more networks that are not shown for simplicity. It should be recognized that the different connections may be different network types (e.g., one PSTN connection, one VOIP connection, etc.), whereas some embodiments may be the same network types (e.g., both connections may be Internet-based connections). The video captioning communication system 200 may further include a call set up server 240, a presence server 250, and a mail server 260 that may be configured to communicate with one or more of the communication devices 210, 220, and/or the video captioning service 230. The configuration and operation of each of these devices will be discussed further below.

The presence server 250 may be configured to monitor the presence and availability of the different communication devices of the video captioning communication system 200. As discussed above, in some embodiments, the video captioning communication system 200 may be a closed system in that each communication device may be required to be registered and configured to participate in such a captioned video call—even those communication devices used by hearing-capable users that are not authorized to receive text captions themselves. As a result, the presence server 250 may receive availability updates from the various communication devices registered with the video captioning communication system 200 indicating that they are connected to a suitable network and otherwise available for receiving such a video call. End users may log out of the application or otherwise change a setting indicating whether they are available for video calls through the application even if a suitable network connection is present. As a result, prior to a call being set up, the different communication devices of the may be aware of the presence or "status" of the different communication devices in their contacts list, recent calls list, or others whom may desire to call.

During call set up, the call set up server 240 may be configured to set up the call between the endpoints. The following example is provided for the situation in which the first communication device 210 calls the second communication device 220 (however, it should be understood that the roles would be reversed for calls initiated by the second communication device 220). The first communication device 210 sends a call request to the call set up server 240 with the ID (e.g., IP address, phone number, etc.) of the second communication device 220. The call request may also have the ID and protocols (e.g., video protocol, audio protocol, etc.) to be used for the call with the first communication device 210. Suitable media protocols may include, but are not limited to, Real-Time Transport Protocol (RTP), Interactive Connectivity Establishment (ICE) protocols.

The call set up server 240 sends the call request to the second communication device 220 for response thereto. As a result, the communication devices 210, 220 may each be supplied with the various known ways to contact it, such as a private IP address, a public IP address (e.g., network address translation (NAT), Traversal Using Relay NAT (TURN)), or other similar addresses and methods. Each of the communication devices 210, 220 may attempt to connect with the other through different combinations to find the best option for the connection. Responsive to the second communication device 220 accepts the call request, the video communication session is set up and the media data 211 is communicated between the first communication device 210 and the second communication device 220 when the connection is established.

The user interface may clearly identify an outgoing call or an incoming call being set up as a video call even before the video call is answered. If an incoming call to the first communication device 210 is not answered, the mail server 260 may be configured to receive and store mail messages. For a video call, the mail server 260 may receive the video mail message from the first communication device 210 and/or the second communication device 220. In some embodiments, the mail server 260 may store the video mail message and send a notification to the first communication device 210 that a new video mail message has been received. For playback of the video mail message, the first communication device 210 may send a request to the mail server 260 for streaming and playback of the video mail message to the first communication device 210. In some embodiments, the video mail message may be stored locally in memory of the first communication device 210.

Text captions may be provided by the video captioning service 230 for the video mail message. In some embodiments, the text captions may be generated when the video mail message is recorded and/or saved. For example, when the video mail message is recorded, the far-end audio 214 may be sent to the video captioning service 230 (via the first communication device, the second communication device, or the mail server 260) with the text captions being generated by the call assistant similar to a live communication session. The text transcription may be generated and sent by the video captioning service as text data to the location storing the video mail message (e.g., mail server 260, first communication device 210, etc.). The text data may be stored in a separate file from the video mail message with the text captions then being retrieved and displayed with the video data during playback of the video mail message. In some embodiments, the text data may include synchronization information that is used to synchronize the text captions with the audio of the video mail message, with the presentation of the captions being similar to a live communication session. In some embodiments, the synchronization information may be adjusted to remove the delay that typically occurs during a live communication session such that the delay of the text captions has been reduced or removed when the video mail message is played by the first communication device 210. It is also contemplated that the text captions may be displayed out of synchronization with the audio of the video mail message. For example, at least a portion of the text transcription or the text transcription in its entirety may be displayed with the video. Such a presentation of the text transcription may be in a separate window or portion of the display screen that displays large blocks of the text transcription, which may allow the hearing-impaired user to read portions of the text caption even before the corresponding audio is played. In some embodiments, the text captions from the text data may be embedded in the video mail message when the video message is saved and/or during playback.

In other embodiments, the text captions may be generated after the video mail message is recorded or saved. For example, the text captions may be generated at the time of playback. In such an embodiment, the video mail message may be recorded and saved without the text transcription being generated. When the first communication device 210 retrieves the video mail message for playback (whether by streaming or from local storage), the far-end audio 214B may be sent to the video captioning service 230 to generate the text transcription with the text data being sent to the first communication device 210 as with in a live communication session. The far-end audio 214B may be sent to the video captioning service 230 by the first communication device 210 or directly from the mail server 260 during playback of the video mail message. The hearing-impaired user may save the video mail message for later reference. In some embodiments, the text transcription is generated during each playback. In other embodiments, the text transcription from the first playback may be saved and used for subsequent playback with the saved text data being retrieved and/or embedded with the video as discussed above. In additional embodiments, stored video mail messages may be captioned prior to being viewed for playback in that the video captioning service 230 may retrieve a stored video mail message (or at least the audio thereof) to provide the captions after the video mail message has been stored, but independent of playback.

FIGS. 3 through 6 are a simplified block diagrams of video captioning communication systems 300, 400, 500, 600 according to additional embodiments of the disclosure. FIG. 3 through 6 have been simplified to only show the first communication device 210, the second communication device 220, and the video captioning service 230 for simplicity of discussion. It should be recognized that the video captioning communication system 300, 400, 500, 600 may also include a call server, a presence server, and/or a mail server that are configured to execute in a similar manner as with the functionality discussed above with respect to FIG. 2.

Figure 3:
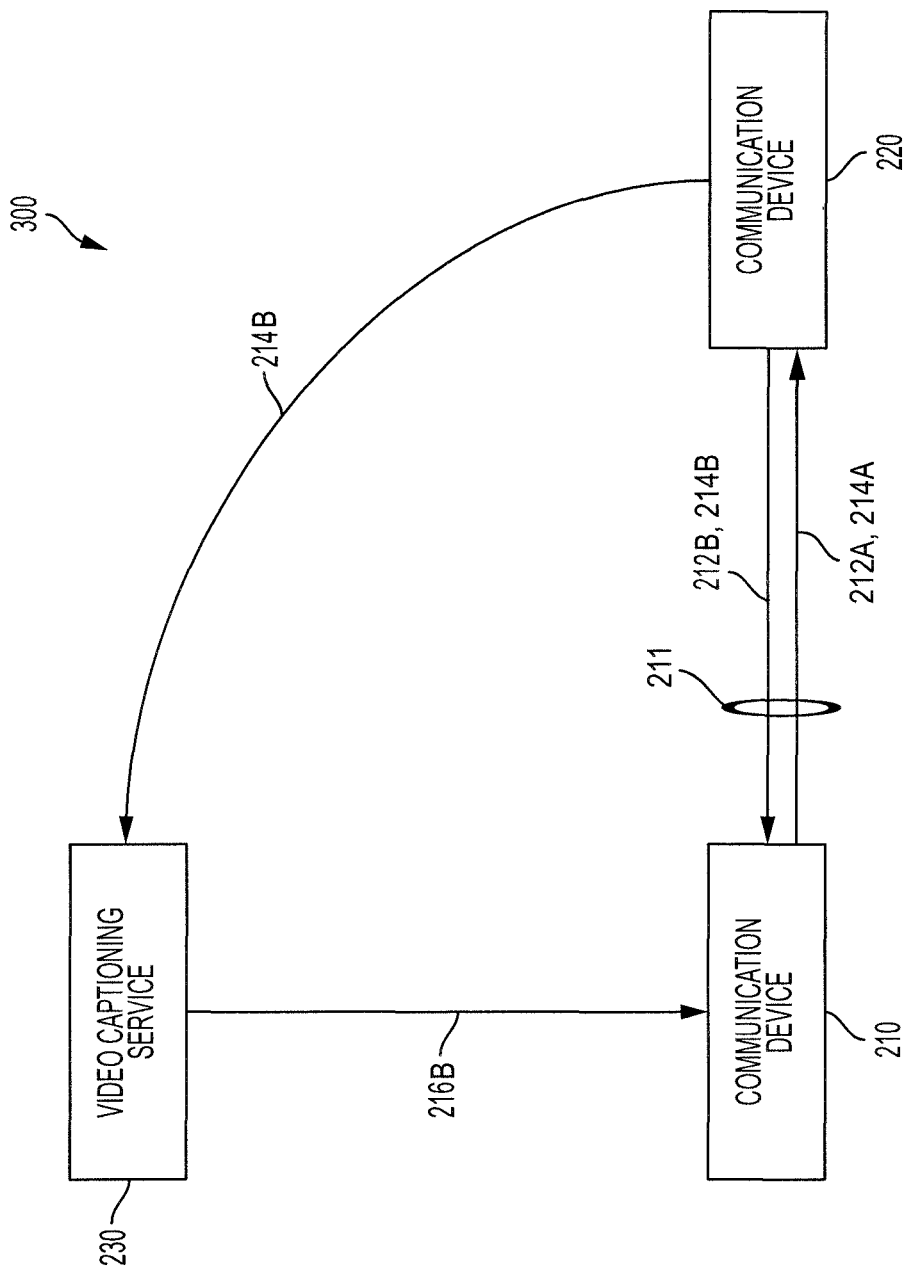

Referring specifically to FIG. 3, it is shown that the second communication device 220 may be configured to split the far-end video 212B and the far-end audio 214B such that the far-end video 212B may be transmitted to the video captioning service 230 directly and separate from the media data 211 communicated between the first communication device 210 and the second communication device 220. In other words, the second communication device 220 may still transmit the far-end video 212B and the far-end audio 214B to the first communication device 210. Sending the far-end audio 214B separately to the first communication device 210 from the second communication device may reduce some of the delay in generating the text transcription of the far-end audio 214B.

To communicate with both the first communication device 210 and the video captioning service 230, the second communication device 220 may have address information for both the first communication device 210 and the video captioning service 230 even though it is the first communication device 210 that is receiving and displaying the text captions for the video communication session. Such information may be provided to the second communication device during call set up (e.g., by the call set up server 240, the first communication device 210, etc.). The video captioning service 230 may also need to have the address information for the first communication device 210 to know where to send the text data 216B generated with the text transcription of the video communication session. The video captioning service 230 may receive such information during call set up (e.g., by the call set up server 240, the first communication device, the second communication device, etc.) or during the video communication session, such as being sent with the far-end audio 214B.

Figure 4:
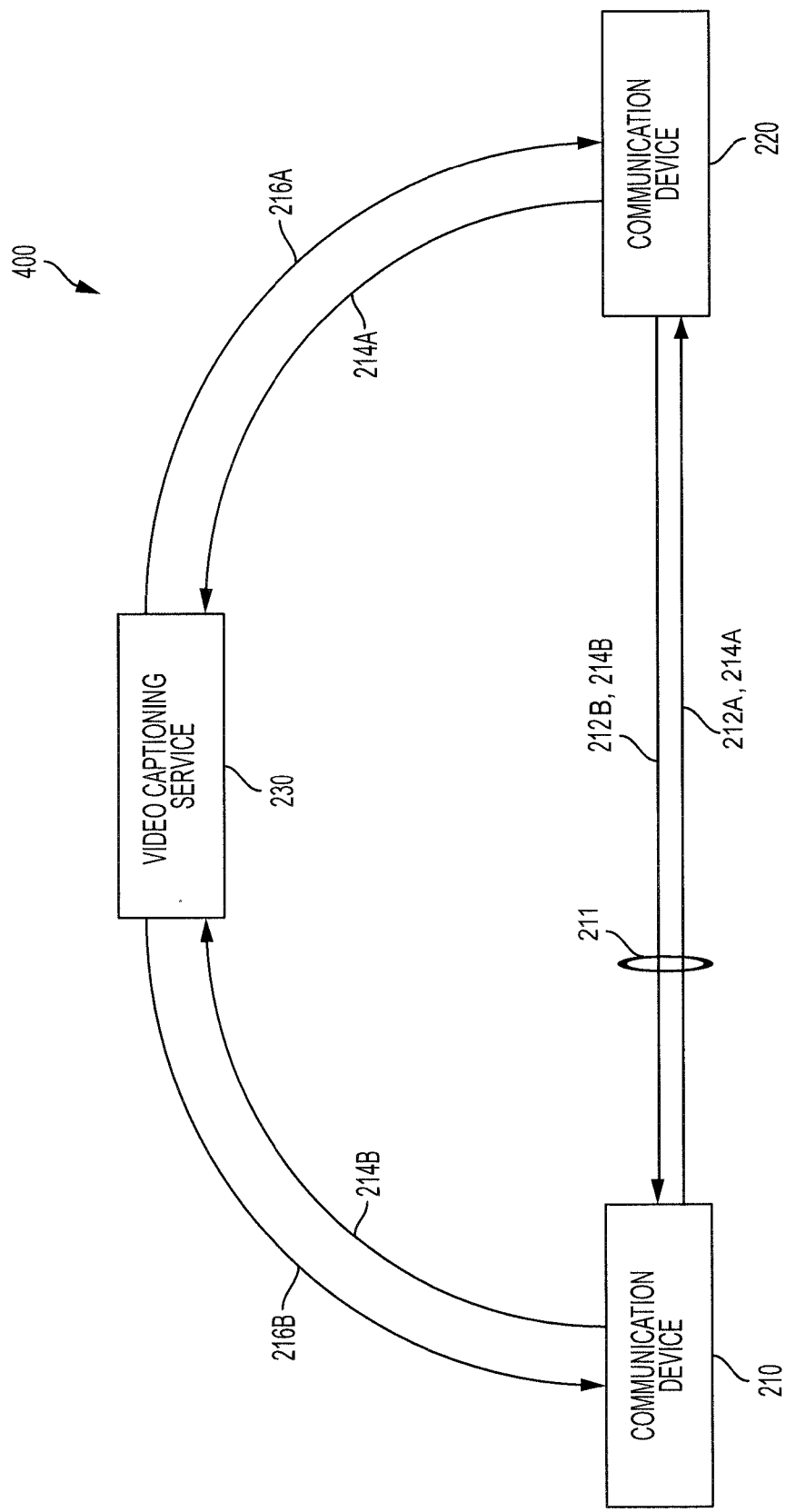

Referring specifically to FIG. 4, a situation is shown in which both the first communication device 210 and the second communication device 220 are receiving and displaying text captions during the video communication session (e.g., both users are hearing-impaired users). In such an embodiment, the media data 211 may be communicated between the first communication device 210 and the second communication device 220 as discussed above. The first communication device 210 may send the far-end audio 214B to the video captioning service 230, which generates and sends the corresponding text data 216B for the text captions back to the first communication device 210. The second communication device 220 may send the near-end audio 214A to the video captioning service 230, which generates and sends the corresponding text data 216A for the text captions back to the second communication device 220. Thus, the first communication device 210 acts as a router for the far-end audio 214B to the video captioning service 230, and the second communication device 220 acts as a router for the near-end audio 214A. The text transcriptions for the near-end audio 214A and the far-end audio 214B may be generated by different call assistants or sessions within the video captioning service 230.

Figure 5:
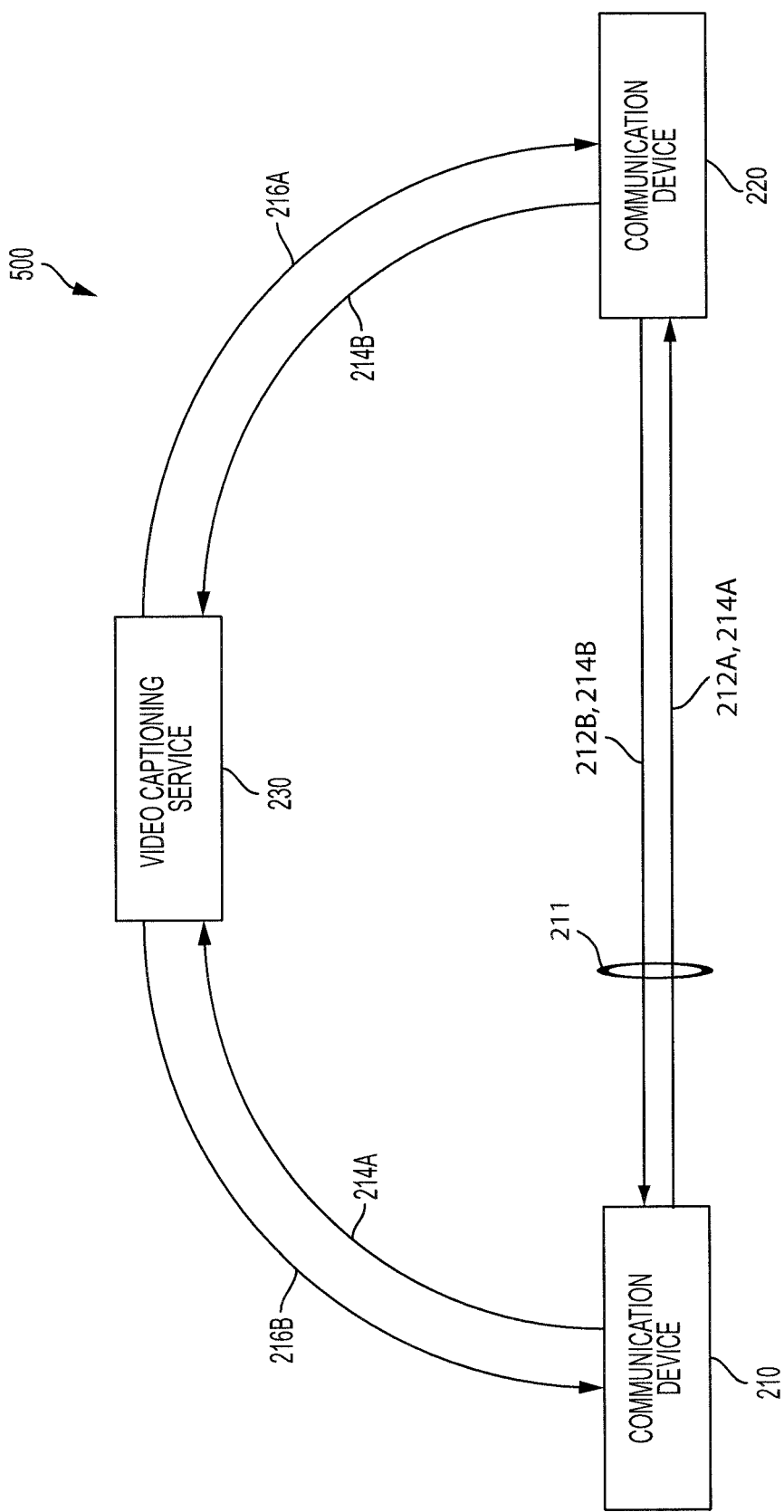

Referring specifically to FIG. 5, a situation is shown in which both the first communication device 210 and the second communication device 220 are receiving and displaying text captions during the video communication session (e.g., both users are hearing-impaired users). In such an embodiment, the media data 211 may be communicated between the first communication device 210 and the second communication device 220 as discussed above. The first communication device 210 may send the near-end audio 214A to the video captioning service 230, which generates and sends the corresponding text data 216A for the text captions forward to the second communication device 220. The second communication device 220 may send the far-end audio 214B to the video captioning service 230, which generates and sends the corresponding text data 216B for the text captions forward to the first communication device 210. Thus, the first communication device 210 and the second communication device 220 send their own audio to the video captioning service 230 but receive the text data corresponding to the other device.

Figure 6:
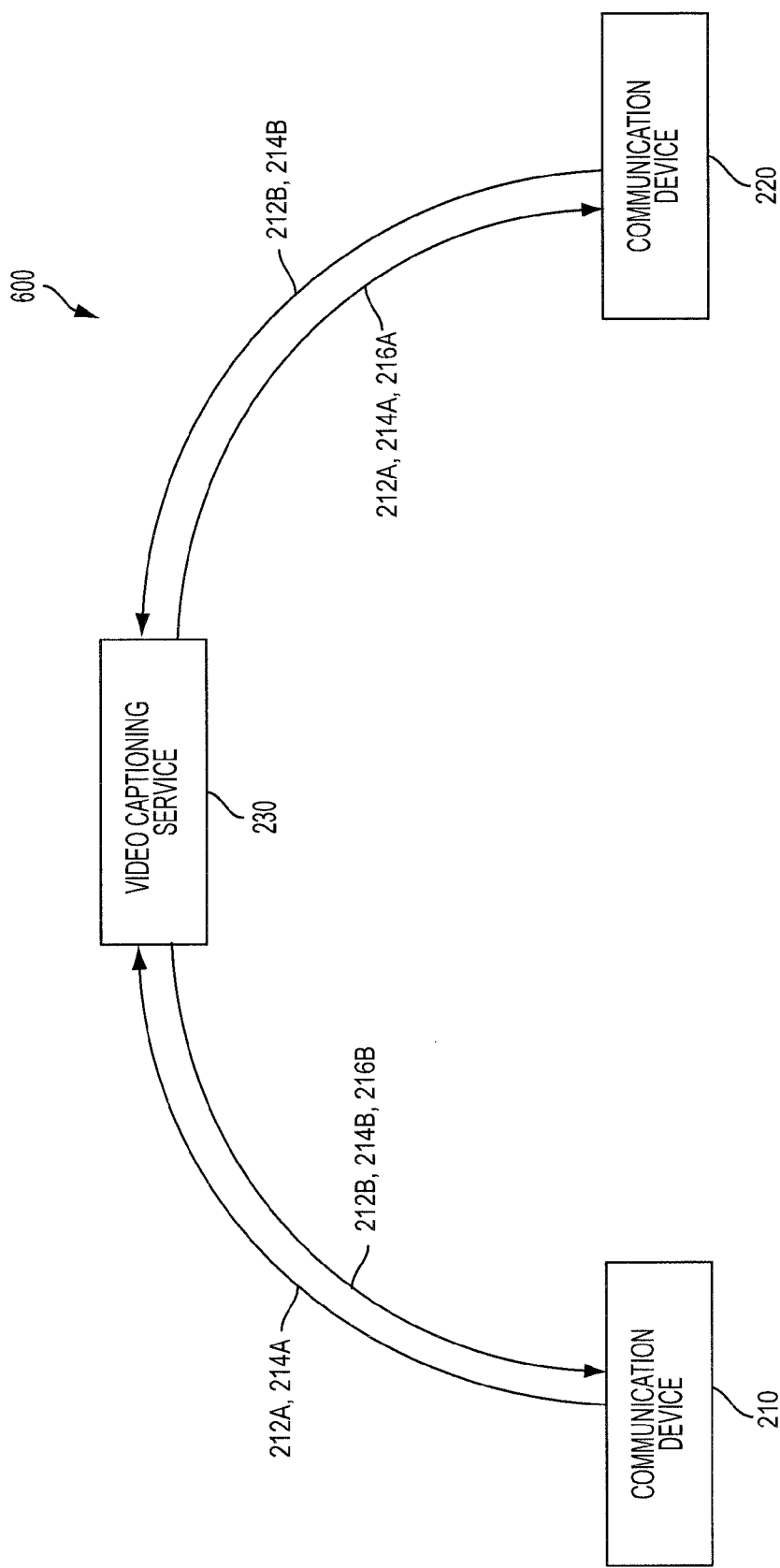

Referring specifically to FIG. 6, a situation is shown in which both the first communication device 210 and the second communication device 220 are receiving and displaying text captions during the video communication session (e.g., both users are hearing-impaired users). In such an embodiment, the media data (e.g., near-end video 212A, near-end audio 214A, far-end video 212B, far-end audio 214B) may be communicated to each other through the video captioning service 230 rather than through a point-to-point connection. Such an embodiment may be used to bypass a firewall on one side (e.g., NAT traversal) of the communication session. The video captioning service 230 may generate and send the corresponding text data 216A, 216B for the text captions forward to other communication device. In such an embodiment, the video captioning service 230 may act as a router for the media data for the video communication session to pull the audio needed to generate the text transcriptions. In some embodiments, the text data 216A, 216B may be sent separately from the media data so that the audio and video may not be delayed while the text transcription is generated.

Additional embodiments may include one or more of the first communication device 210 or the second communication device 220 being configured to generate at least a portion of the text transcription using automatic speech recognition software tools. FIGS. 7 through 10 describe examples of such embodiments. Although these embodiments describe video data and a video captioning service, embodiments herein may automatically generate the text transcription locally on the first communication device 210 or the second communication device 220 in a voice-only communication session.

Figure 7:
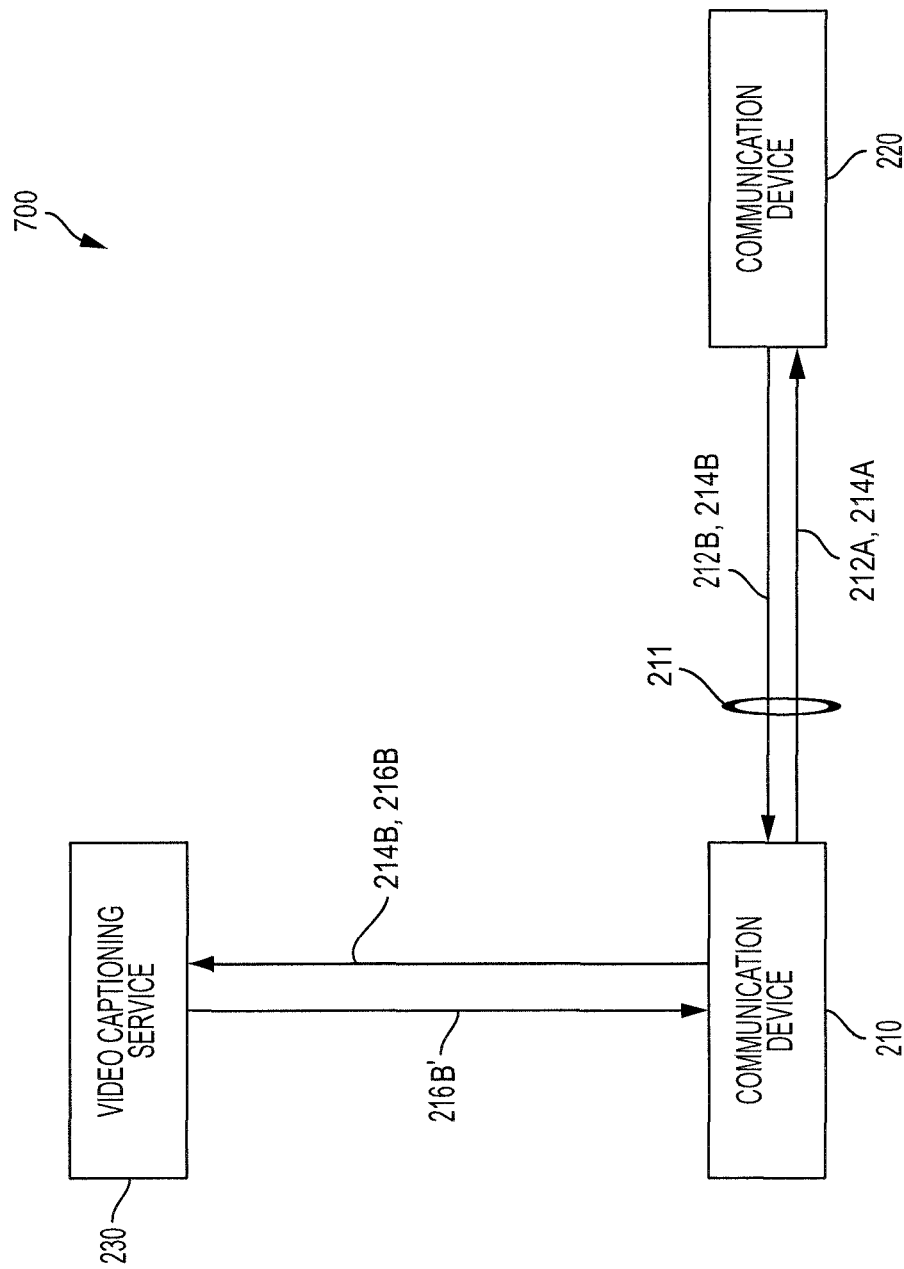

Referring specifically to FIG. 7, a situation is shown in which the first communication device 210 may be configured to automatically generate its own text transcription of the far-end audio 214B for display thereon. The text transcription may be generated using automatic speech recognition software tools stored and operated by the first communication device 210. The text transcription may be displayed locally on the electronic display of the first communication device 210 as well as transmitted as text data 216B to the video captioning service 230 with the far-end audio 214B. Rather than generate the entire text transcription (e.g., via revoicing, etc.) the communication assistant at the video captioning service 230 may view the text transcription (generated by the first communication device 210) as text captions on their electronic display while listening to the far-end audio 214B. Thus, initially, the first communication device 210 and the video captioning service 230 may show the same text captions on both devices simultaneously. The call assistant may identify errors in the text captions and correct the errors by editing a block of text, from which the edited text data 216B' may be transmitted to the first communication device 210 by replacing the corresponding block in the text caption already displayed by the first communication device 210. Such error correction methods may include those described in U.S. Pat. No. 8,739,801, issued Feb. 19, 2013, and entitled "Methods and Systems Related to Text Caption Error Correction," the disclosure of which is incorporated herein in its entirety by this reference.

In some embodiments, the text captions may not initially be displayed on the first communication device 210 prior to transmitting the text data 216B to the video captioning service 230. In such an embodiment, the edited text data 216B' may include the entire block of text for the text captions rather than just the portions thereof that were edited.

Figure 8:
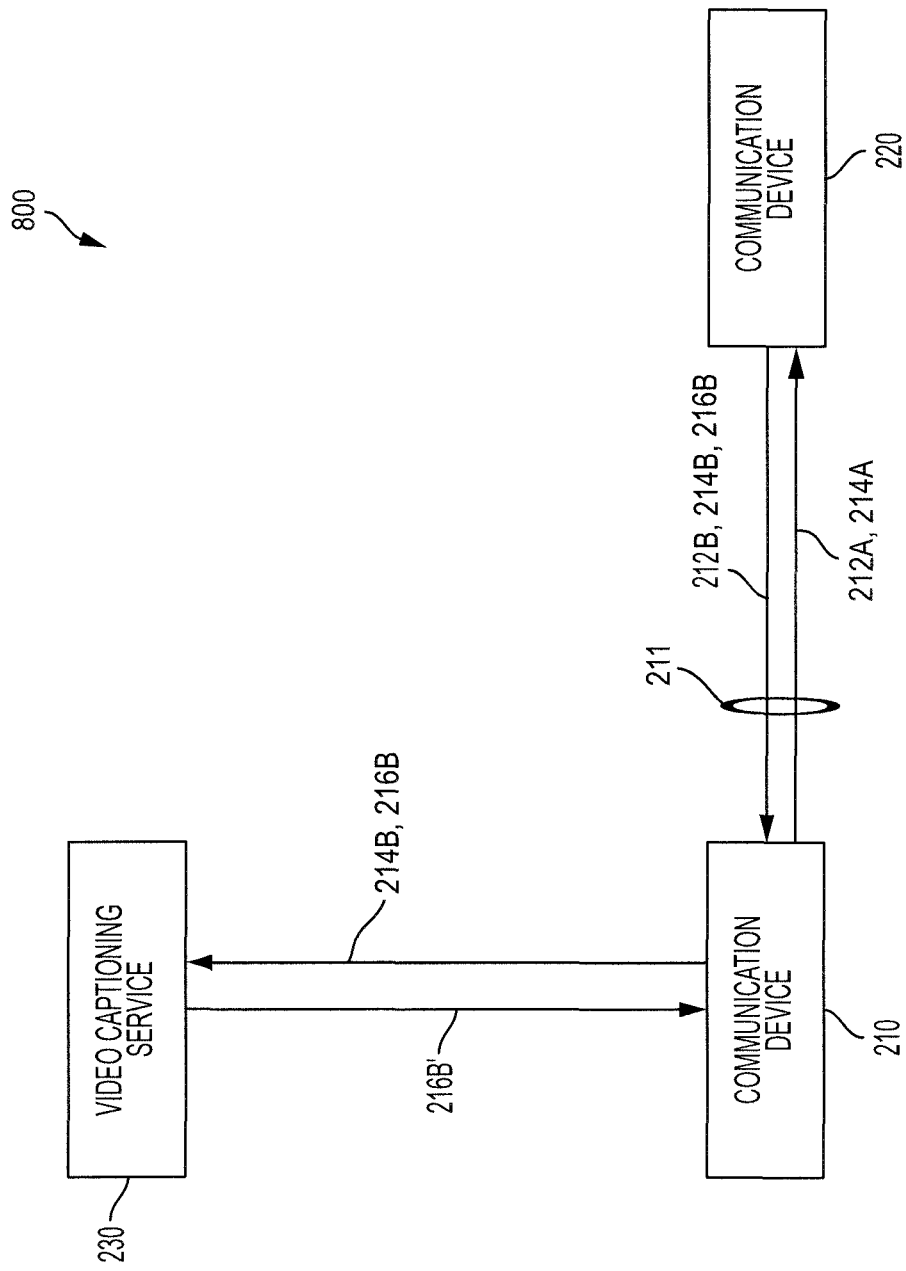

Referring specifically to FIG. 8, a situation is shown in which the second communication device 220 may be configured to automatically generate its own text transcription of the far-end audio 214B for transmission as text data 216B to the first communication device 210 with the other media data 211. The text transcription may be generated using automatic speech recognition software tools stored and operated by the second communication device 220. The text transcription may be received and then displayed locally on the electronic display of the first communication device 210. The first communication device 210 may also transmitted the text data 216B to the video captioning service 230 with the far-end audio 214B for generating the edited text data 216B' as discussed above with respect to FIG. 7.

Figure 9:
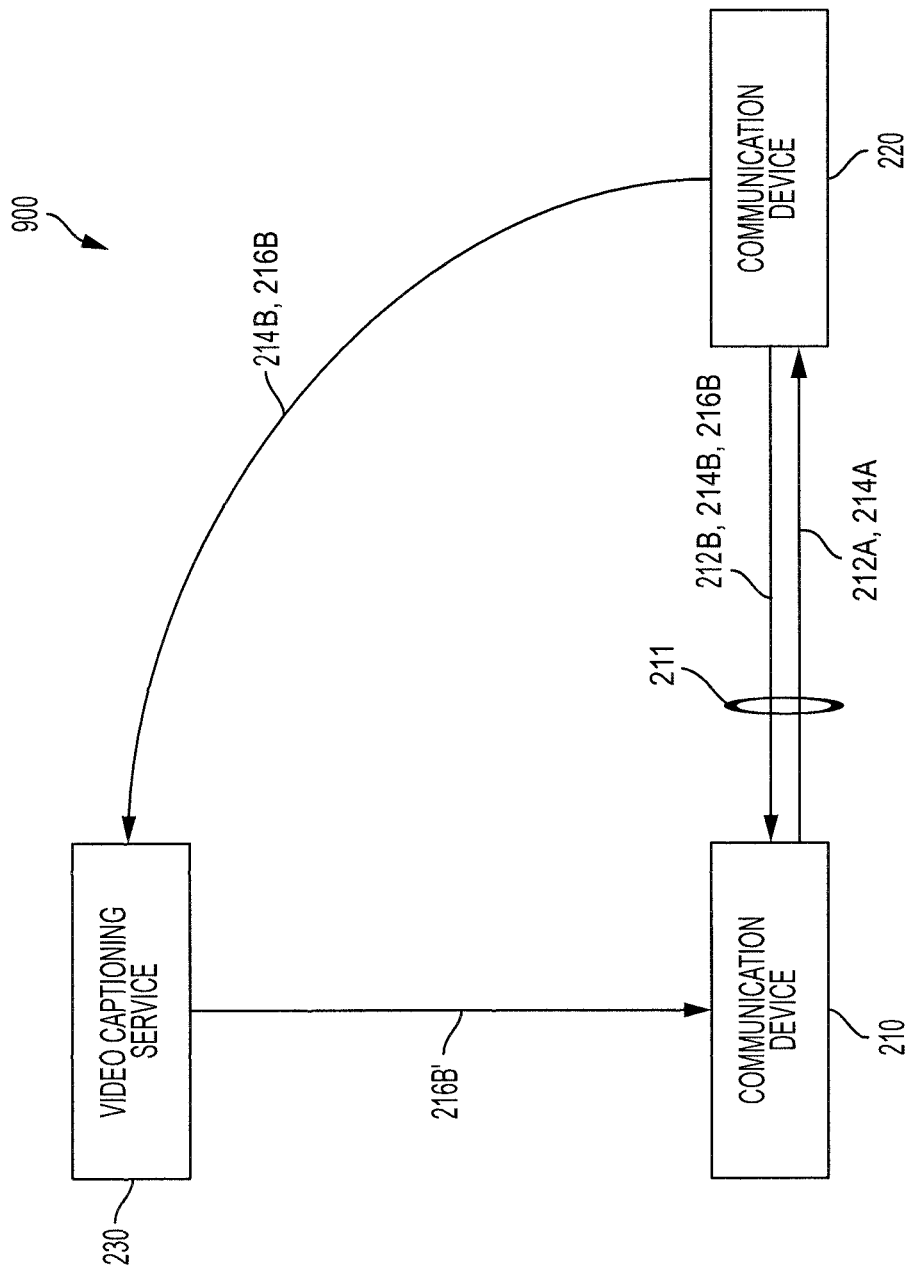

Referring specifically to FIG. 9, a situation is shown in which the second communication device 220 may be configured to automatically generate its own text transcription of the far-end audio 214B for transmission as text data 216B to the video captioning service 230 with the far-end audio 214B.

The text data 216B may also be transmitted to the first communication device 210 with the other media data 210. The text transcription may be generated using automatic speech recognition software tools stored and operated by the second communication device 220. The first communication device 210 may receive and display the text data 216B as text captions as discussed above. The video captioning service 230 may also receive the text data 216B with the far-end audio 214B and generate the edited text data 216B' to replace blocks of text displayed by the first communication device 210 containing errors as discussed above with respect to FIG. 7.

Figure 10:
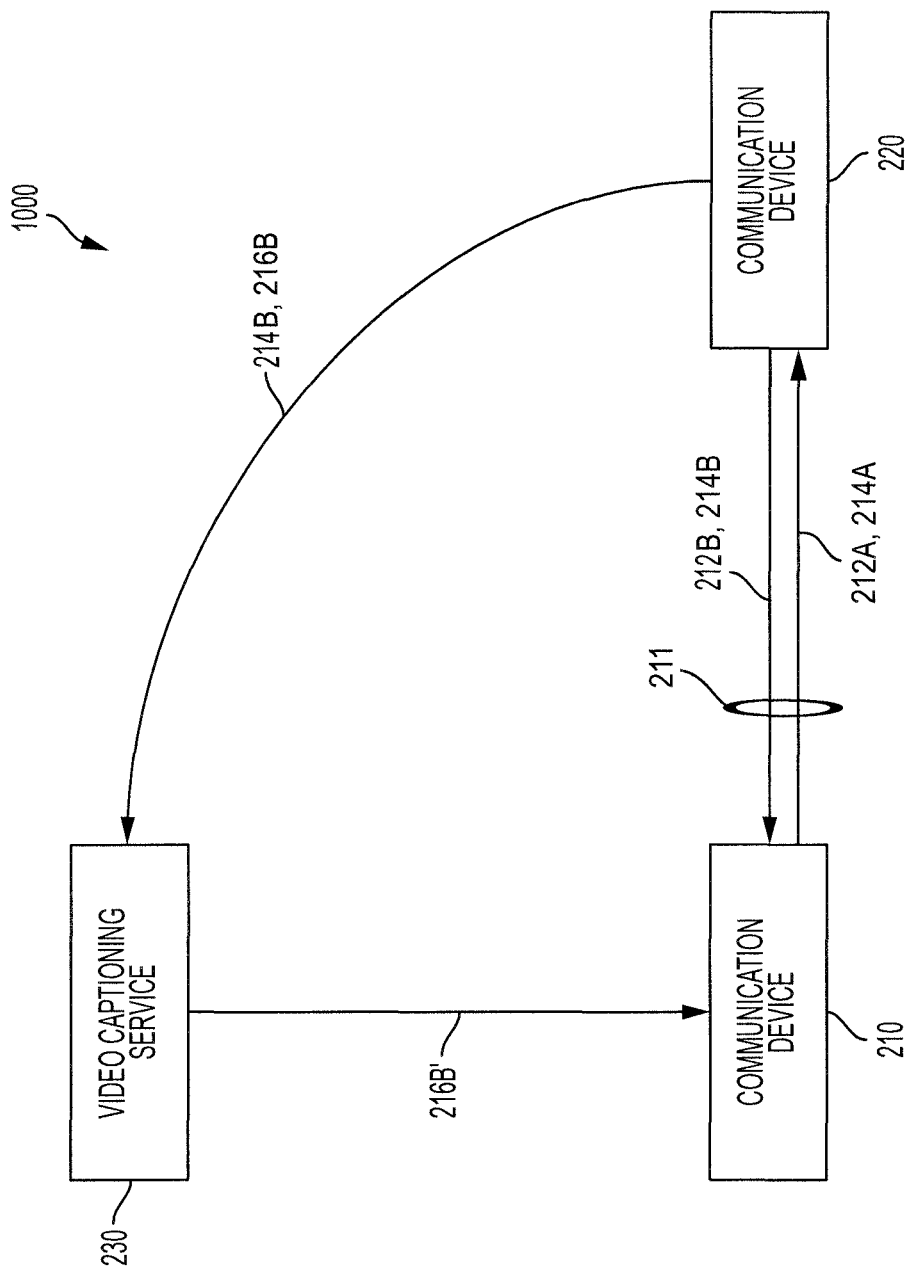

Referring specifically to FIG. 10, a situation is shown in which the second communication device 220 may be configured to automatically generate its own text transcription of the far-end audio 214B for transmission as text data 216E to the video captioning service 230 with the far-end audio 214B. The text transcription may be generated using automatic speech recognition software tools stored and operated by the second communication device 220. The video captioning service 230 may receive the text data 216B with the far-end audio 214B and generate the edited text data 216B' as discussed above with respect to FIG. 7. In such an embodiment in which the first communication device 210 may not have already displayed the text captions, the edited text data 216B' may include the entire block of text for the text captions rather than just the portions thereof that were edited.

Figure 11:
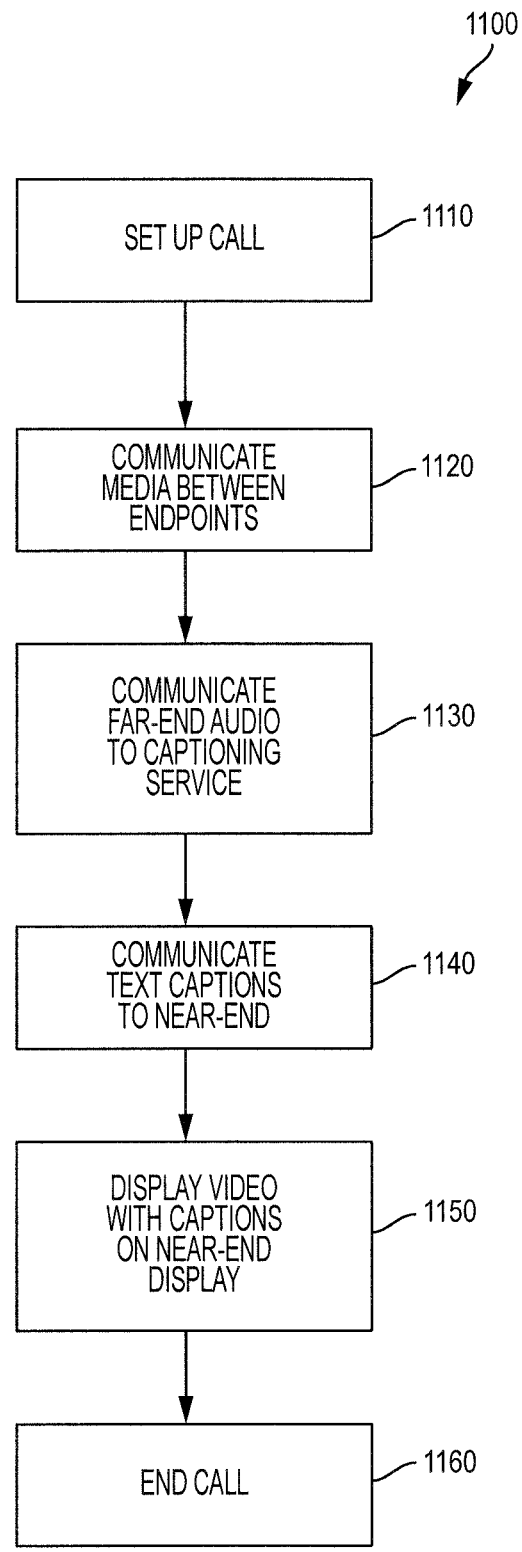
FIG. 11 is a flowchart illustrating a method for captioning a video communication session for a conversation between two users according to an embodiment of the disclosure.

FIG. 11 is a flowchart 1100 illustrating a method for captioning a video communication session for a conversation between at least two users according to an embodiment of the disclosure. This example is given from the perspective of the first communication device that is configured to receive and display captions for a video communication session with the second communication device.

At operation 1110, the video call may be set up. As discussed above, the call may be set up through a call set up server that supplies each communication device with the information needed to communicate with each other (e.g., addresses, protocol information, etc.).

At operation 1120, media data may be communicated between endpoints (i.e., communication devices). The media data may include the near-end audio/video and the far-end audio video. The media data may be communicated point-to-point between the communication devices in some embodiments (see, e.g., FIGS. 2 through 5). In other embodiments, the media data may be communicated through the video captioning service 230 (see, e.g., FIG. 6).

At operation 1130, the far-end audio may be communicated to the video captioning service. In some embodiments, the first communication device may route the far-end audio to the video captioning service. In other embodiments, the far-end audio may be sent to the video captioning service from another device, such as the second communication device itself.

At operation 1140, text captions may be transmitted to the first communication device. The text captions may be generated and transmitted as text data including a text transcription of the far-end audio during the video communication session. In some embodiments, either the first communication device or the second communication device may generate at least a portion of the text transcription (e.g., FIGS. 7 through 10).

At operation 1150, the video and the text captions may be displayed on the near-end display of the first communication device. The text captions may be displayed as an overlay on the video data, in a separate window, in a portion of the interface dedicated to the text captions or through other presentation methods.

At operation 1160, the call may be ended and the connections to the second communication device and the video captioning service may be terminated. Prior to ending the call, operations 720 through 750 may continue.

Figure 12:
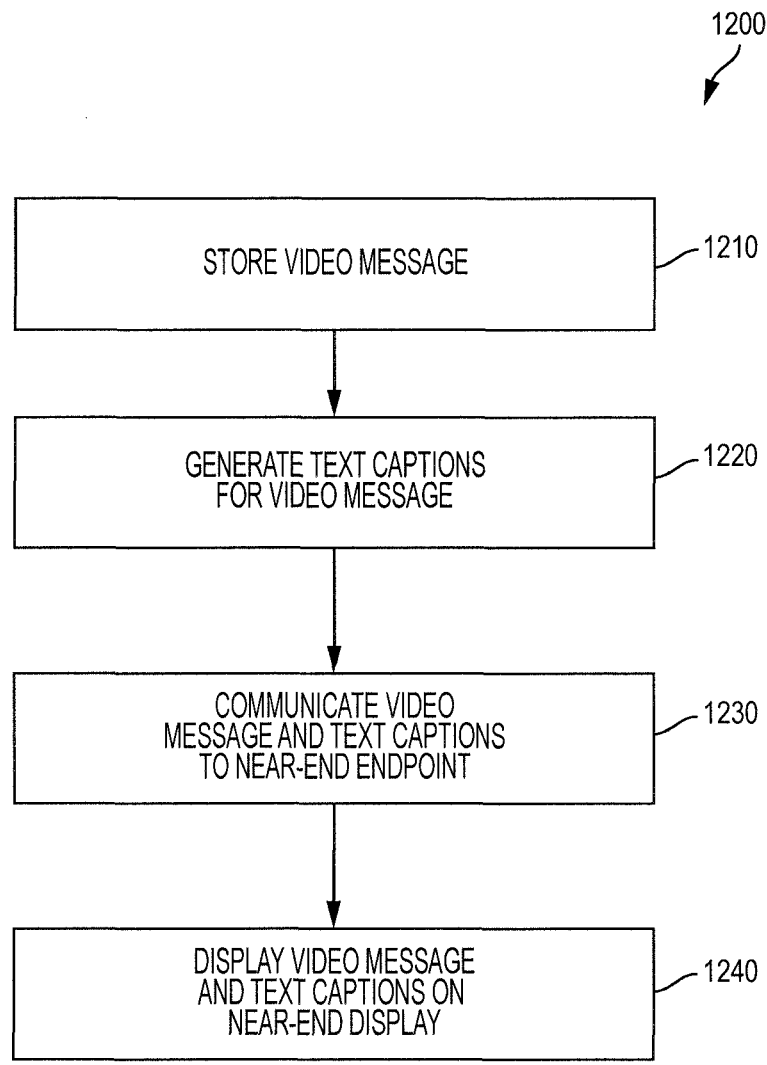
FIG. 12 is a flowchart illustrating a method for captioning a video mail message according to an embodiment of the disclosure.

FIG. 12 is a flowchart 1200 illustrating a method for captioning a video mail message according to an embodiment of the disclosure. This example is given from the perspective of the first communication device that is configured to receive and display captions for a video mail message received from the second communication device.

At operation 1210, the video mail message may be generated and/or stored. In some embodiments, the video mail message may be stored on a remote server (e.g., a mail server) for retrieval during playback by the first communication device. In other embodiments, the video mail message may be stored locally by the first communication device for local playback.

At operation 1220, the text captions may be generated for the video mail message. In some embodiments, the text captions may be generated while the video mail message is being recorded and/or stored. In other embodiments, the text captions may be generated at during playback by providing the audio from the video mail message to the video captioning services during remote streaming or local playback. The audio may be sent to the video captioning services via the first communication device, the mail server, or other device having such data.

At operation 1230, the video message and text captions may be transmitted to the first communication device (i.e., near-end endpoint). The video message and text captions may be sent separately, as embedded data, or through other methods.

At operation 1240, the video message and text captions may be displayed on the electronic display of the first communication device (i.e., near-end display). The text captions may be displayed as an overlay on the video data, in a separate window, in a portion of the interface dedicated to the text captions or through other presentation methods.

Figure 13:
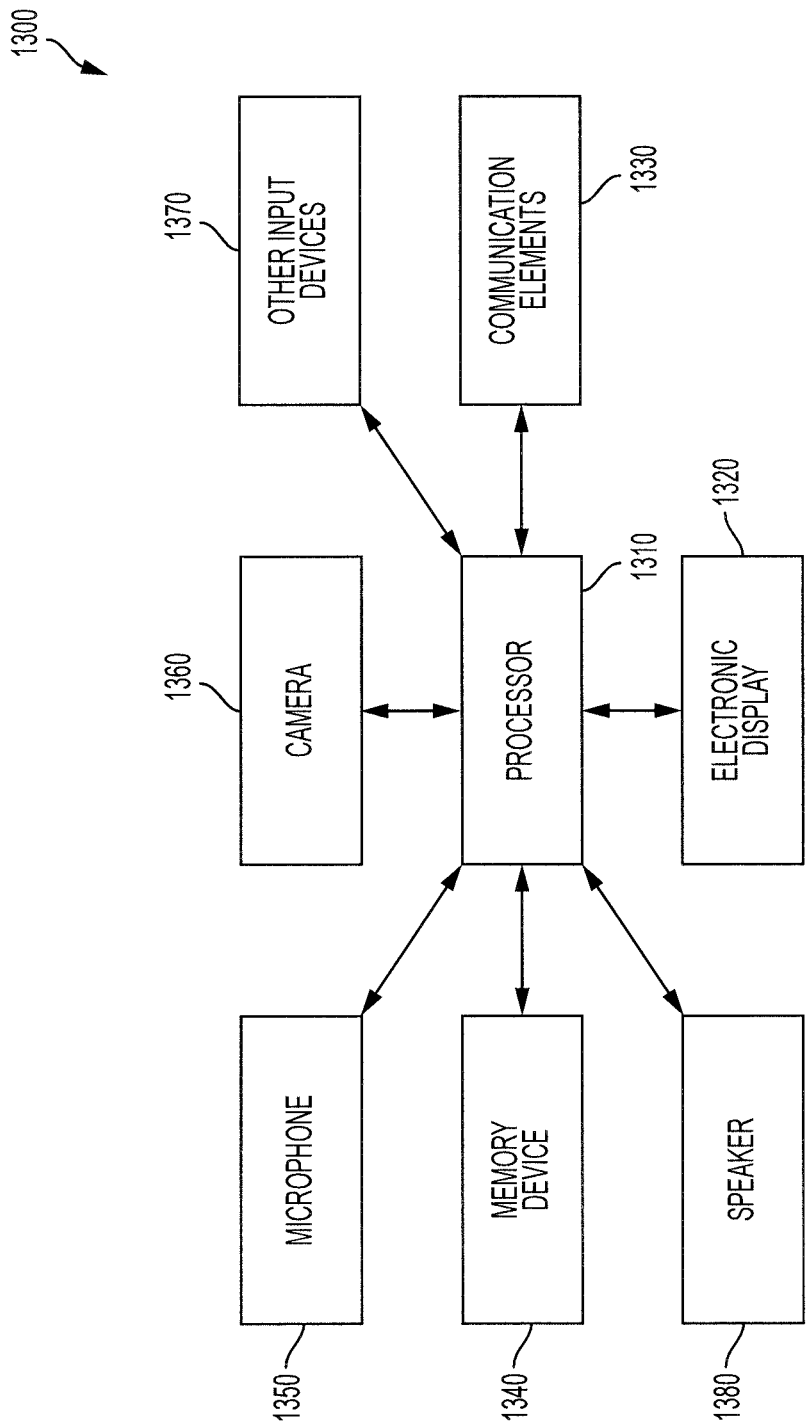
FIG. 13 is a simplified schematic block diagram of a communication device associated with a hearing-impaired user according to an embodiment of the disclosure.

FIG. 13 is a simplified schematic block diagram of a communication device 1300 associated with a hearing-impaired user according to an embodiment of the disclosure. For example, the communication device 1300 may be the first communication device 110 of FIG. 1. In particular, the communication device 1300 may be configured to establish video calls with other communication devices and captioning communication sessions with the video captioning service configured to assist the hearing-impaired user. The communication device 1300 may be a caption enabled communication device, which may be implemented as a standalone device (e.g., a caption phone), or as implemented on another device (e.g., tablet computer, laptop computer, smart phone, etc.).

The communication device 1300 may include a processor 1310 operably coupled with an electronic display 1320, communication elements 1330, a memory device 1340, microphone 1350, camera 1360, other input devices 1370, and a speaker 1380. The processor 1310 may coordinate the communication between the various devices as well as execute instructions stored in computer-readable media of the memory device 1340. The processor 1310 may be configured to execute a wide variety of operating systems and applications including the computing instructions. The memory device 1340 may be used to hold computing instructions, data, and other information for performing a wide variety of tasks including performing embodiments disclosed herein. By way of example and not limitation, the memory device 1340 may include Synchronous Random Access Memory (SRAM), Dynamic RAM (DRAM), Read-Only Memory (ROM), Flash memory, and the like. The memory device 1340 may include volatile and non-volatile memory storage for the communication device 1300.

The communication elements 1330 may be configured to communicate with other devices or communication networks, including other communication devices and the video captioning service. As non-limiting examples, the communication elements 1330 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The other input devices 970 may include a numeric keypad, a keyboard, a touchscreen, a remote control, a mouse, buttons, other input devices, or combinations thereof.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication device specifically configured for use by a hearing-impaired user, the communication device comprising:
   a microphone configured to generate near-end audio;
   a camera configured to generate near-end video;
   communication elements configured to communicate media data with a second communication device and receive text data from a video captioning service during a video communication session, including being configured to:
      transmit the near-end audio and the near-end video to the second communication device;
      receive far-end audio and far-end video from the second communication device; and
      receive the text data from the video captioning service, the text data including a text transcription of the far-end audio; and
   an electronic display configured to display the text data as text captions along with the far-end video during the video communication session; and
   a processor operably coupled with the microphone, the camera, the communication elements, and the electronic display, and configured to:
      control the operation thereof in communicating with the second communication device and the video captioning service during the video communication session, wherein the second communication device is associated with a hearing-capable user that is not authorized to receive text captions from the video communication service during the video communication session; and
      send invitations to contacts from a contact list for hearing-capable users to download a video call application and register with the video captioning service without being authorized to receive text captions during video communication sessions.

2. The communication device of claim 1, wherein the processor is further configured to route the far-end audio from the second communication device to the video captioning service during video communication sessions.

3. The communication device of claim 1, wherein the processor is further configured to receive the far-end audio from the video captioning service during video communication sessions.

4. The communication device of claim 1, wherein the processor is further configured to:
   retrieve a video mail message from a video mail server; and
   receive text data as text captions from the video captioning service generated with assistance of a live call assistant at the video captioning service during playback of the video mail message.

5. The communication device of claim 4, wherein the processor is configured to transmit audio from the video mail message to the video captioning service during playback of the video mail message.

6. A video captioning communication system, comprising:
   a far-end communication device configured to generate audio data and video data transmitted to a near-end communication device during a real-time video communication session with the near-end communication device; and
   a video captioning service configured to receive the far-end audio and generate text data with a text transcription of the far-end audio, and transmit the text data to the near-end communication device during the video communication session,
   wherein the video captioning service is further configured to manage a database of registered hearing-impaired users and registered hearing-capable users that are permitted to participate in video communication sessions with each other in which the registered hearing-impaired users are authorized to receive text captions from the video captioning service and the authorized to receive text captions from the video captioning service during video communication sessions; and
   wherein the far-end communication device is linked with a registered hearing-capable user in the database, and is further configured to:
      transmit the audio data and the video data over a point-to-point connection to the near-end communication device during the video communication session; and
      transmit the audio data directly to video captioning service the during the video communication session without being routed through the near-end communication device.

7. The video captioning communication system of claim 6, further comprising a mail server configured to:
   receive a video mail message generated by the far-end communication device responsive to a video call not being answered by the near-end communication device; and
   transmit the video mail message to the near-end communication device.

8. The video captioning communication system of claim 7, wherein the video captioning service is configured to receive audio of the video mail message from the mail server or the near-end communication device for a live call assistant at the video captioning service to generate text captions for the video mail message.

9. The video captioning communication system of claim 8, wherein the video captioning service is configured to generate the text captions for the video mail when the video mail message is recorded or saved with the assistance of the live call assistant.

10. The video captioning communication system of claim 6, wherein the far-end communication device is linked with a registered hearing-capable user account responsive to the hearing-capable user accepting an electronic invitation received from a registered hearing-impaired user associated with the near-end communication device.

11. A video captioning communication system comprising:
    a far-end communication device configured to generate audio data and video data transmitted to a near-end communication device during a real-time video communication session with the near-end communication device; and
    a video captioning service configured to receive the far-end audio and generate text data with a text transcription of the far-end audio, and transmit the text data to the near-end communication device during the video communication session, wherein:
        the far-end communication device is associated with a hearing-capable user that is not authorized to receive text captions during the video communication session; and
        the video captioning service is a closed system that is configured to manage a database of registered users that are permitted to participate in video communication sessions with each other in which at least one party is authorized to receive text captions from the video captioning service, and wherein the video captioning service is configured to:
            query contact lists within the database of registered users;
            link the registered hearing-capable user with matched contacts from the contact lists; and
            send a notification to communication devices for the registered users that have the matched contacts to indicate that the registered hearing user is available to participate in video communication sessions.

12. A method for captioning a video communication session for a conversation between at least two users, the method comprising:
    setting up a video communication session between a first communication device and a second communication device;
    communicating media data through a point to point connection between the first communication device and the second communication device during the video communication session, the media data including near-end audio and near-end video from the first communication device and far-end audio and far-end video from the second communication device;
    communicating the far-end audio from the second communication device directly to a remote video captioning service through a separate connection than the point to point connection without being routed through the first communication device during the video communication session using a video call application stored on the second communication device that is not authorized to receive text captions from the remote video captioning service;
    communicating text captions from the remote video captioning service to the first communication device corresponding to a text transcription of the far-end audio during the video communication session; and
    displaying the text captions and the far-end video on an electronic display of the first communication device during the video communication session.

13. A video captioning system, comprising:
    at least one server including:
        memory storing a database of registered users for a video captioning service network, wherein:
            registered hearing-impaired users are authorized to receive text captioning from a video captioning service during video communication sessions; and
            registered hearing-impaired users are not authorized to receive text captioning from the video captioning service during a video communication sessions; and
        a processor operably coupled with the memory, and configured to:
            manage invitations sent to hearing-capable users to join the video captioning service network;
            query contact lists of the registered users of the video captioning service network responsive to a hearing-capable user accepting an invitation to become a new registered hearing-capable user of the video captioning service network;
            link the new registered user with contact lists of other registered users within the video captioning service network; and
            send a notification to the other registered users within the video captioning service network that have the new registered user as a contact in its contact list indicating that the new registered user is available for participating in video communication sessions through the video captioning service network.

14. The video captioning system of claim 13, wherein the at least one server includes a presence server configured to detect a presence of each communication device associated with the registered users across the video captioning service network and send a presence notification to the other registered users within the video captioning service network that have each respective registered user in its contact list indicating whether the communication devices is available for participating in video communication sessions through the video captioning service network.

15. The video captioning service of claim 13, wherein the at least one server includes a call set up server configured to set up a video call between a first video communication device linked with a first registered user and a second video communication device linked with a second registered user.

16. The video captioning service of claim 15, wherein the first registered user is a hearing-impaired user, and the second registered user is a hearing-capable user.

17. The video captioning service of claim 16, wherein the second communication device has a video call application installed thereon configured to provide limited functionality to communicate with the video captioning service without receiving or displaying text captions during the video call.

18. The video captioning service of claim 17, wherein the video call application of the second communication device linked with the hearing-capable user is configured to:
    transmit audio for the second communication device directly to the first video communication device during the video call via a point-to-point connection; and
    transmit the audio for the second communication device directly to the video captioning service during the video call via a separate connection than the point-to-point connection.

19. The video captioning service of claim 13, wherein the video call application of the second communication device linked with the hearing-capable user is further configured to:
- locally generate text captions for the audio during the video call using speech recognition software executed by the second communication device; and
- transmit the text captions the locally-generated text captions to the video captioning service with the audio during the video call for the video captioning service to correct errors in the locally generated text captions that are sent to be displayed by the first communication device.

20. The video captioning service of claim 13, wherein the at least one server includes a video mail server configured to:
- receive a video mail for a missed video call; and
- send audio for the video mail to the video captioning service to generate text captions for the video mail with the assistance of a live call assistant at the video captioning service during at least one of recording, saving, or playback of the video mail.

21. The video captioning communication system of claim 8, wherein the text captions for the video mail message are stored in a separate file than the video mail message.

22. The video captioning communication system of claim 21, wherein the near-end communication device is configured to display at least a portion of the text captions as a block of text prior to display of its corresponding portion of the video mail message when generated from the stored separate file.

* * * * *